(12) United States Patent
Sun et al.

(10) Patent No.: US 8,830,929 B2
(45) Date of Patent: Sep. 9, 2014

(54) INTENTIONAL IDLE GAPS IN COEXISTING WIRELESS NETWORKS

(75) Inventors: Yanjun Sun, Richardson, TX (US); Ariton E. Xhafa, Plano, TX (US); Ramanuja Vedantham, Allex, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 170 days.

(21) Appl. No.: 13/161,082

(22) Filed: Jun. 15, 2011

(65) Prior Publication Data

US 2011/0310826 A1    Dec. 22, 2011

Related U.S. Application Data

(60) Provisional application No. 61/355,352, filed on Jun. 16, 2010.

(51) Int. Cl.
| | |
|---|---|
| H04W 4/00 | (2009.01) |
| H04J 3/00 | (2006.01) |
| H04W 72/00 | (2009.01) |
| H04W 84/18 | (2009.01) |
| H04W 72/04 | (2009.01) |
| H04W 84/12 | (2009.01) |
| H04W 72/12 | (2009.01) |
| H04W 88/06 | (2009.01) |

(52) U.S. Cl.
CPC .............. *H04W 72/00* (2013.01); *H04W 84/18* (2013.01); *H04W 72/04* (2013.01); *H04W 84/12* (2013.01); *H04W 72/12* (2013.01); *H04W 88/06* (2013.01)
USPC .......................................... 370/329; 370/336

(58) Field of Classification Search
USPC ................................. 370/329, 336; 455/553.1
See application file for complete search history.

(56) References Cited

U.S. PATENT DOCUMENTS

| 7,925,297 | B2 * | 4/2011 | Zhu et al. .................... 455/553.1 |
| 8,160,032 | B2 * | 4/2012 | Yang et al. ..................... 370/336 |
| 2003/0048798 | A1 * | 3/2003 | Scott et al. ..................... 370/412 |
| 2005/0192048 | A1 * | 9/2005 | Bridgelall .................. 455/553.1 |
| 2010/0069112 | A1 | 3/2010 | Sun et al. |
| 2010/0130129 | A1 | 5/2010 | Chang et al. |
| 2010/0238807 | A1 | 9/2010 | Xhafa et al. |

* cited by examiner

*Primary Examiner* — Mark Rinehart
*Assistant Examiner* — Angel Brockman
(74) *Attorney, Agent, or Firm* — Steven A. Shaw; Frederick J. Telecky, Jr.

(57) ABSTRACT

A wireless combination device includes a first wireless transceiver configured for communication via a first wireless network over a first band, and a second wireless transceiver configured for communication via a second wireless network over a second band that overlaps the second band. The combination device includes a medium allocation scheduler coupled to the first wireless transceiver and second wireless transceiver for implementing spaced-mode operation that intentionally inserts idle gaps in transmissions via the second wireless network when triggered by the presence of at least one spaced-mode triggering condition. The idle gaps allow wireless transmissions via the first wireless network to be received by the combination device with higher probability, and without the need for clear to send (C2S) protection.

21 Claims, 3 Drawing Sheets

INTENTIONAL IDLE GAPS IN COEXISTING WIRELESS NETWORKS

CROSS REFERENCE TO RELATED APPLICATIONS

This application claims the benefit of Provisional Application Ser. No. 61/355,352 entitled "INTRODUCING INTENTIONAL IDLE GAPS IN COEXISTING WIRELESS NETWORKS", filed Jun. 16, 2010, which is herein incorporated by reference in its entirety.

FIELD

Disclosed embodiments are directed, in general, to wireless communication systems and, more specifically, wireless networks having coexisting overlapping bands.

BACKGROUND

As wireless technologies proliferate, mobile wireless devices incorporate a multiplicity of different wireless standards. For example, a cellular telephone can accommodate a cellular network (e.g., Universal Mobile Telecommunications System), a wireless local area network ("WLAN"), such as IEEE 802.11, and a wireless personal area network ("WPAN"), such as Bluetooth (BT). Including WPAN access makes utilization of a wireless device more convenient by allowing use of wireless headsets and other short-range wireless appliances.

Mobile wireless devices are sometimes capable of accessing multiple wireless networks. Some wireless networks occupy an adjacent or overlapping frequency spectrum. For example, BT and IEEE 802.11b/g/n (for WLAN) both utilize the same 2.4-2.5 GHz band. Access to such overlapping networks can be coordinated via time multiplexing or frequency multiplexing to reduce performance degradation caused by collisions that may occur when these networks are simultaneously accessed. However, such multiplexing is often at the cost of shorter medium time available to each radio and thus lower performance, as a radio may be blocked from transmitting or receiving packets temporally to avoid collisions.

The limited medium time available to each radio is more problematic when a single mobile wireless device such as a cellular smart phone supports both radios in overlapping RF bands (referred to herein as a "combo device" short for combination device). For example, a wireless device that supports both WLAN Access Point (AP) functionalities with simultaneous BT activities.

Collisions may occur in a wireless communication medium when multiple stations (STAs) within an RF transmission coverage area concurrently utilize overlapping RF channels. RF channels may overlap when at least one frequency is common between two or more of the concurrent RF channels. Collisions may result in unsuccessful transfer of data via the wireless communication medium, which may in turn result in reduced data transfer rates for data transmitted by the STAs. For example, a user may use his or her cell phone as a WLAN AP so that he or she can share, show, print, and synchronize content by connecting with other Wi-Fi consumer electronics (CE), such as a digital picture frame, without an infrastructure network nearby. At the same time, the user may listen to stereo music played by the cell phone via a BT headset.

In one particular arrangement, a cell phone displays photos to a digital picture frame through Wi-Fi, serving as a WLAN AP. At the same time, the cell phone can play music through a BT headset. Conventional collision protection techniques such as powersave (PS) and CTS-2-Self are not applicable or are inefficient in avoiding rate or packet drops between the cell phone and the digital picture frame.

For example, FIG. 1 depicts an example timing diagram for a known combo device (e.g., cell phone) comprising a first and a second transceiver serving as a WLAN AP showing WLAN signals received over a first network from a WLAN STA by the first transceiver and Advanced Audio Distribution Profile (A2DP) signals transmitted by the combo device by the second transceiver over a second network to a WPAN device such as a BT device. The wide line on the time axes indicate the time intervals that the first and second transceivers are granted access to the medium (e.g., by a processor on the combo device). As the combo device is serving as a WLAN AP is assumed to be always on, the PS mode for the combo device is not available, so packets over the first network can arrive any time from a STA associated to the combo device, even when BT is granted and is occupying the medium.

It can be seen in FIG. 1 that BT transmission activities by the combo device are handled in a batch-mode with the three (3) A2DP packets shown transmitted one right after the other (back-to-back-packets). When the WLAN STA misses the CTS frame shown (e.g., due to being in PS mode) transmitted by the combo device, the WLAN STA transmits initial packets shown received at the combo device as $RX_1$, and the WLAN STA starts retransmitting including retransmissions of the same packets to the combo device shown as $RX_{2-4}$ during the combo node's BT activities (where BT is granted access to the medium). This is because when the STA sends a packet to the combo device, the STA expects an acknowledgment (ACK) from the combo device following the transmission. If the ACK has not been received in time, the STA will retransmit the same packets up to some predetermined limit of attempts/times. Such retransmissions reduce the PHY rate which reflects the speed at which client devices communicate with the combo device/AP, and can also lead to packet drops if no ACK is received by the STA when the retransmission number limit is reached.

Thus, when a combo device serves as a WLAN AP with concurrent coexisting overlapping network traffic, such as BT A2DP and IEEE 802.11b/g/n WLAN traffic, the conventional protection technique of CTS is undesired or even ineffective, such as when an associated STA is in PS mode. If a STA starts transmitting during the combo device's BT activities, continuous retransmissions can lead to a reduced PHY rate or even packet drops as shown in FIG. 1, which will significantly lower the network throughput. In addition, the CTS frames will block the nearby networks from communicating during the combo node's BT activities, which can significantly reduce channel utilization in nearby networks.

SUMMARY

Disclosed embodiments recognize that when a combo device serves both as an AP (e.g., a WLAN AP) and as a terminal for a second coexisting overlapping network terminal (e.g., BT) in a wireless system, a wireless STA associated with this combo device can experience low PHY rates and even packet drops. Moreover, conventional protection techniques such as C2S and PS mode are not as efficient as they are when the combo device does not serve as an AP. For example, PS mode is not available when a combo device serves as an AP. Although disclosed embodiments are generally described where the combo device serves as an AP, disclosed embodiments also include arrangements where the combo device is only a STA in the network, such as a WLAN STA.

When a STA stays in PS mode and has its radio off, which can be the case for mobile devices, a C2S frame from the combo device cannot reach the STA and thus cannot defer transmissions from the STA as expected. As shown in FIG. 1 described above, if the STA starts transmitting during the combo node's second network activities, continuous retransmissions can lead to low PHY rate or even packet drops, which will significantly lower the network throughput. In addition, the C2S will block the nearby networks during the combo node's second network activities, which can significantly reduce channel utilization in the nearby networks.

Disclosed embodiments provide medium allocation algorithms based on the presence or absence of one or more triggering conditions that allow entering a spaced-mode operation for second network transmissions, referred to herein as "spaced-mode triggering conditions", which when triggered intentionally introduces idle gaps between pending packets thus spacing out second network activities, and devices therefrom. Conventional batch-mode operation can be used for the second network transmissions when no triggering conditions are present.

Benefits of disclosed algorithms are several. Disclosed spaced-mode operation helps to detect incoming packets with higher probability, and without the need of C2S protection. Disclosed spaced-mode operation increases the PHY rate and eliminates or at least reduces packet drops. Transmissions and retransmissions from a STA in PS mode can be detected and handled by the combo device in a timely manner to help avoid PHY rate drop or packet drops, and the number of C2S frames can be reduced to improve channel utilization of nearby networks.

NOTATION AND NOMENCLATURE

Figure 1:
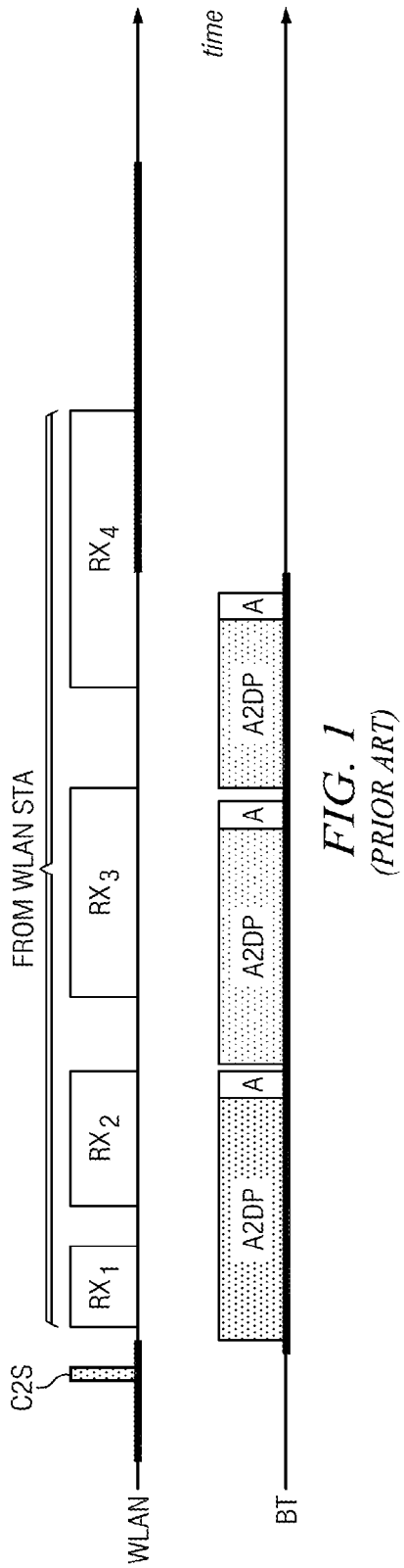
FIG. 1 depicts an example timing diagram for a known combo device comprising a first and a second transceiver serving as a WLAN AP in a coexisting network showing WLAN signals received from a WLAN STA by the first transceiver and second network signals transmitted by the combo device by the second transceiver to a WPAN shown as a BT.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless connection. The term "WLAN" refers to a wireless local area network, for example, in the IEEE 802.11 protocol. The term BT refers to the Bluetooth® wireless protocol. The term "U-APSD" refers to an unscheduled automatic power-saving delivery mode, where certain circuits are turned off when not needed for various computing functions. The term "PSPoll" refers to a power save poll frame, which may be used to alert a node of a network that the node sending the frame is available for data transmission. The term "AP" refers to an access point, which may be a device that facilitates wireless communication in a wireless network. The term "CTS2Self" refers to a frame, which may reserve a period of network silence. The terms "RTS" and "CTS" refer to Request to Send and Clear to Send messages, respectively. The term "ACK" refers to an acknowledgement message.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Disclosed embodiments include medium allocation algorithms for combo devices that provide condition triggered spaced-mode operation that intentionally spaces out communications between a combo device over a second network (e.g., BT) with a second wireless device such as a WPAN device by introducing idle gaps between the second network pending packets. Disclosed idle gaps allow communications between the combo device over a first coexisting and overlapping network to occur with a first wireless STA during the idle gaps. For example, when a STA sends a packet to the combo device which acts as an AP for the network, the STA expects an ACK from the combo device/AP following the transmission. If the ACK has not been received in time, the STA will retransmit the packet up to some predetermined number of times (e.g., 7 times). If no ACK is received when this number limit is reached, the packet may be discarded at the STA resulting in a PHY rate drop or packet drops. As described herein, when disclosed gaps in transmissions of second network activities for the combo device are intentionally introduced, the number of retransmissions from the STA are reduced avoiding PHY rate drop, and the predetermined limit is less likely to be reached and thus less packets will be discarded by the STA.

During operation of disclosed combo devices, operation can dynamically and automatically switch between disclosed spaced-mode and conventional batch-mode based on the conditions currently present. Disclosed spaced-mode helps to detect incoming packets with higher probability without the need of C2S protection, but can be less efficient where there are backlogged traffic due to the overhead associated with switching.

Accordingly, when there is no traffic or light traffic on the first network (e.g. WLAN), disclosed spaced-mode operation for second network communications can be used. If the first network (e.g. WLAN) traffic is moderate or heavy, conventional batched-mode for second network communications can be used. An exception to traffic level directed mode operation can be when the second network carries time-sensitive information (e.g., BT can carry A2DP). Since disclosed spaced-mode operation introduces extra delays for second network transmissions, disclosed embodiments include protection against the delays introduced by the spaced-mode going over a maximum permitted delay time for sensitive information (e.g., A2DP) that can be tolerated.

Figure 2A:
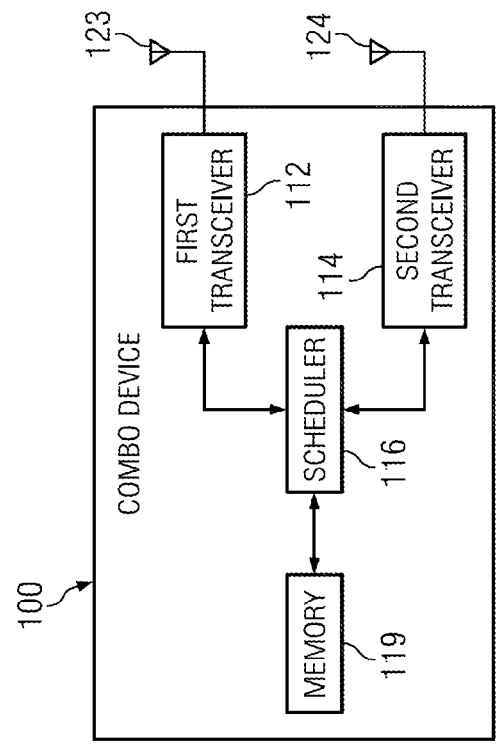
FIG. 2A shows an example wireless combination device including a first wireless transceiver for communicating via a first wireless network, a second wireless transceiver for communicating via a second wireless network that overlaps the first wireless network, and a medium allocation scheduler coupled to the first wireless transceiver and second wireless transceiver for intentionally inserting idle gaps in transmissions via the second wireless network when there is at least one spaced-mode triggering condition, according to an example embodiment.

FIG. 2A shows an example wireless combo device 100 including a first wireless transceiver 112 for communicating via a first wireless network, a second wireless transceiver 114 for communicating via a second wireless network that overlaps the first wireless network, and a medium allocation scheduler 116 coupled to the first wireless transceiver 112 and second wireless transceiver 114. The medium allocation scheduler 116 is configured for switching the combo device 100 between disclosed spaced-mode operation and that intentionally inserting idle gaps in transmissions via the second wireless network and conventional batch-mode operation based on whether or not at least one spaced-mode triggering condition is present. The medium allocation scheduler 116 can be embodied as a digital signal processor having associated memory 119 that stores a disclosed medium allocation scheduling algorithm. Although certain modules are shown separate herein, such as scheduler 116 and memory 119 in FIG. 2A with respect to the transceivers 112 and 114, such modules may only be logically separate from the transceivers 112 and 114. For example, some disclosed modules can physically reside together in the same microcontroller (MCU) in a real system.

First transceiver 112 is coupled to antenna 123 and second transceiver is coupled to second antenna 124. In another embodiment, the transceivers 112, 114 share an antenna. In one particular embodiment the first wireless network comprises a WLAN and the second wireless network comprises a WPAN. Example WPANs include BT, as well as Zigbee and LTE which use the ISM band.

Figure 2B:
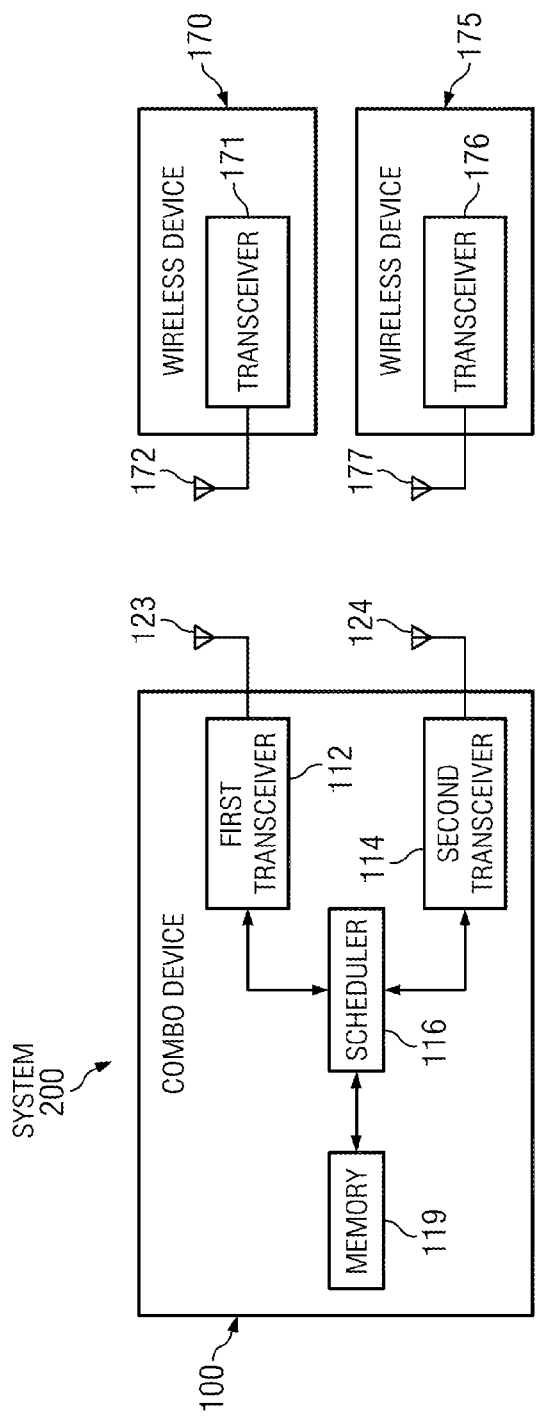
FIG. 2B shows an example wireless system including the wireless combination device shown in FIG. 1A communicating with a first wireless device via the first wireless network, and communicating with a second first wireless device via the second wireless network, according to an example embodiment.

FIG. 2B shows an example wireless coexisting network 200 including the wireless combo device 100 shown in FIG. 2A communicating with a first wireless STA 170 comprising transceiver 171 and antenna 172 via the first wireless network, and communicating with a second first wireless device 175 comprising transceiver 176 and antenna 177 via the second wireless network, according to an example embodiment. In an alternate embodiment, the second wireless device 175 is a slave device that only includes a receiver instead of a transceiver, such as a BT earpiece. In one particular embodiment the first wireless network comprises WLAN and the second wireless network comprises a WPAN such as BT.

Figure 3:
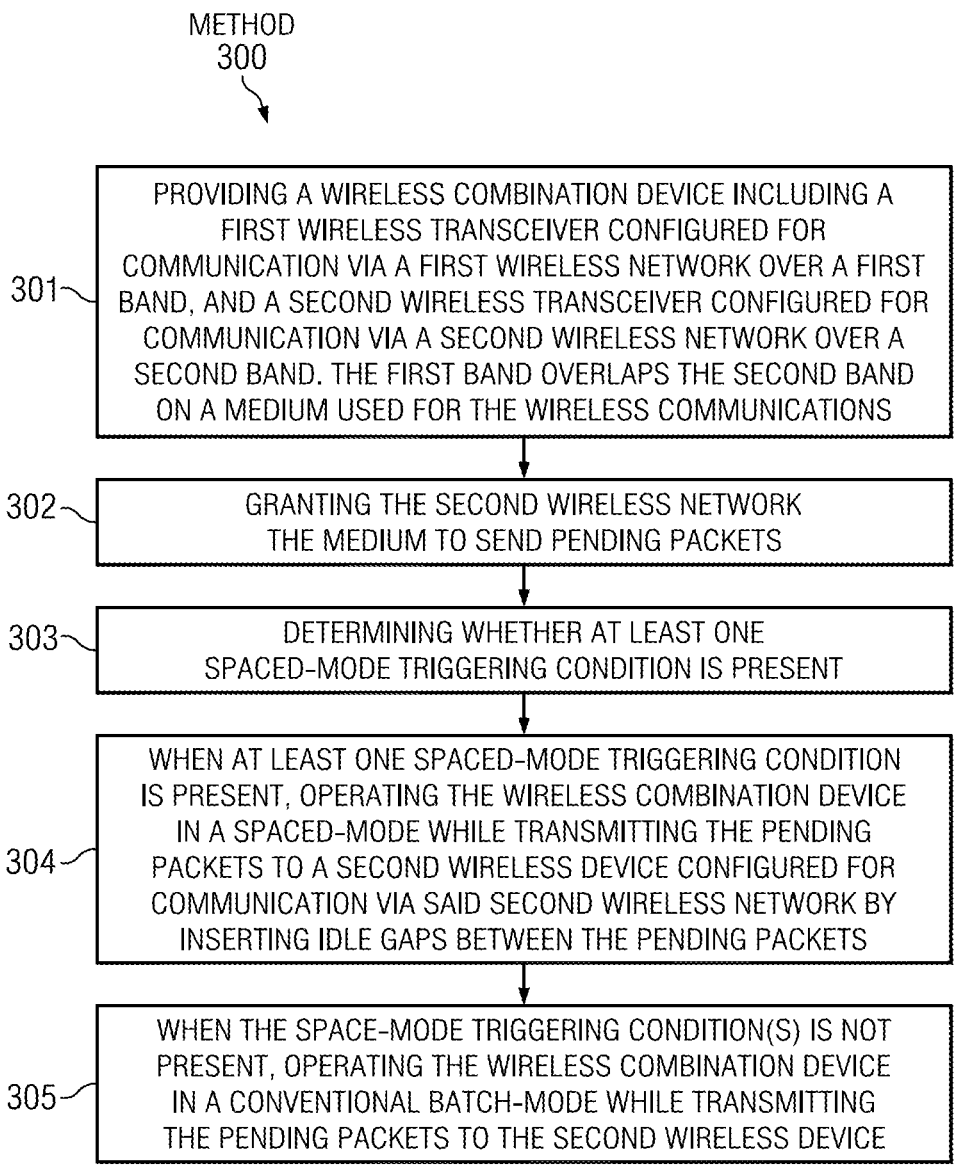
FIG. 3 is a flow diagram for a method for introducing intentional idle gaps in coexisting wireless networks, according to an example embodiment.

FIG. 3 is a flow diagram for an example method 300 of wireless communications, according to an example embodiment. Step 301 comprises providing a wireless combo device such as combo device 100 shown in FIG. 2A including a first wireless transceiver configured for communication via a first wireless network over a first band, and a second wireless transceiver configured for communication via a second wireless network over a second band. The first band overlaps the second band on a medium used for the wireless communications. Step 302 comprises granting the second wireless network the medium to send pending packets. Step 303 comprises determining whether at least one spaced-mode triggering condition is present.

Example spaced-mode triggering conditions that can be used (individually or any combination) to trigger disclosed spaced-mode operation for second network transmissions include, but are not limited to:

i) when no first network (e.g., WLAN) frames have been received by the combo device over a predetermined period, such as during a first past (most recent) time window;

ii) when the number of first network (e.g., WLAN) frames received by the combo device in a second past (second most recent) time window is below some predetermined threshold, iii) when a pattern in a received first network frame signatures the end of a flow is detected (e.g., TCP FIN, ACK);

iv) when no first network STA is associated with the AP running at the combo node;

vi) C2S is not being used to defer transmission from other nodes in the first network, and vii) when the number of delay-sensitive pending packets (e.g., A2DP BT packets) is below some (predetermined) threshold.

When at least one spaced-mode triggering condition is present, step 304 is followed. Step 304 comprises operating the wireless combo device in a spaced-mode while transmitting the pending second network packets to a second wireless device that is configured for communication via the second wireless network by inserting idle gaps between the pending packets. When at least one spaced-mode triggering condition is not present, step 305 is followed. Step 305 comprises operating the wireless combination device in a conventional batch-mode (back-to-back packets) while transmitting the pending packets to the second wireless device. As noted above, the intentional insertion of idle gaps provided by disclosed spaced-mode operation allow the wireless combo device to help detect incoming packets from a first network STA with higher probability, and without the need for C2S protection which results in improved channel utilization of nearby networks.

Figure 4:
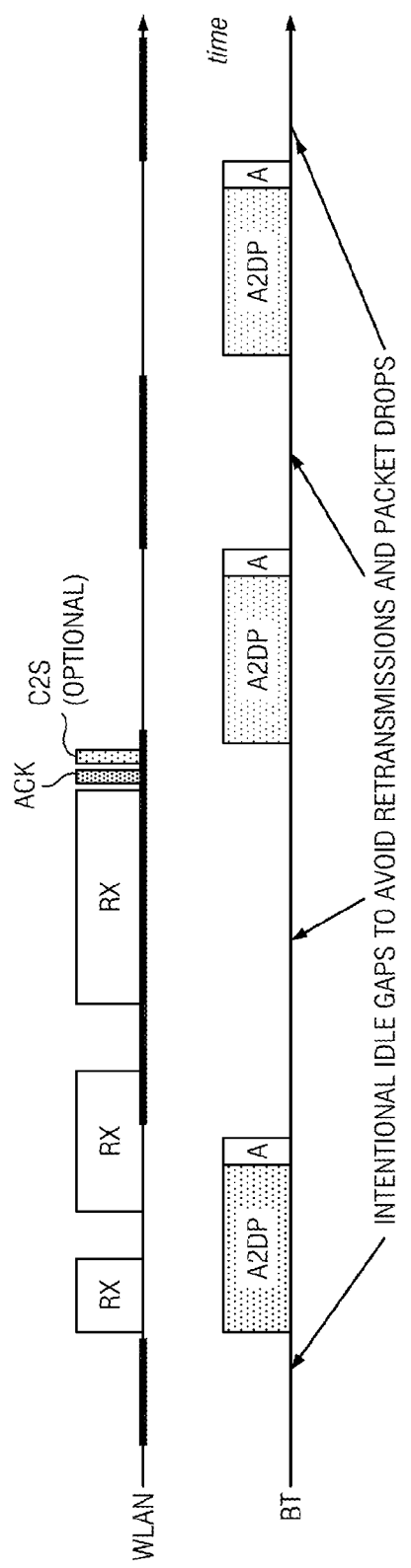
FIG. 4 is a timing diagram showing example spaced-mode operation of a disclosed combo device, according to an example embodiment.

FIG. 4 depicts a timing diagram showing example spaced-mode operation of a disclosed combo device comprising a first and a second transceiver serving as an AP in a network, according to an example embodiment. In this example, the combo device has detected at least one spaced-mode triggering condition, such as the associated STA operating on the first network is in PS mode, and thus a C2S frame from the combo device may fail to reach the STA.

Instead of transmitting the queued second network packets shown as BT packets in a conventional batch mode (e.g., the back-to-back fashion as shown in FIG. 1), as shown in FIG. 4, some idle gaps are intentionally introduced between BT transmissions, so that the first transceiver of the combo device may detect a transmission/retransmission from the STA in a more timely manner. In this example, once the convergence protocol (PLCP) header of the second retransmission from the STA is detected by the combo device, the next BT transmission activity is deferred and the medium allocation scheduler 116 keeps the medium allocated to WLAN so that the whole packet can be successfully received. Accordingly, this example demonstrates the retransmission from the STA is detected and handled at a much earlier stage than the batch-mode case in FIG. 1 which prevents PHY rate drop and possible packet drops. Thus, when disclosed spaced-mode operation is entered and thus disclosed second network (e.g., BT) gaps are intentionally introduced, the retransmission limit is less likely to be reached and thus less packets will be discarded by the STA.

In one particular example embodiment, wherein a BT Master device in the BT network transmits at even BT slots with each even BT slot being x msecs in duration, durations of the idle gaps can be integer multiples of 2×msecs. For example, x can=0.625 msec, and the idle gaps can be integer multiples of 1.25 ms.

Several parameters may be tuned in disclosed medium allocation algorithms including the length of the second network gaps, length of a second network (e.g., BT) activity, and whether a C2S frame is used after receiving a first network (e.g., WLAN) packet. For a simple example, in one embodiment, the time for a second network packet exchange is used as the length of a second network activity (e.g. an A2DP in the case of BT). The medium time that is not used by second network activities can be evenly divided and inserted in between second network activities. If an incoming packet from the first network is detected, the algorithm can keep the medium allocated to the first medium (e.g. WLAN) to receive the packet. After the reception, a C2S frame can be sent before the second network (e.g., BT) radio starts to occupy the medium exclusively, due to strong locality often observed in network traffic. As long as the C2S frames defers transmissions from the STA, the algorithm can switch to conventional batch-mode for second network activities as shown in FIG. 1 with the second network shown as BT period protected by C2S frames. If no first network (e.g., WLAN) packet has been received after some threshold of time, intentional idle gaps between second network activities (e.g., BT) can be introduced again.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

We claim:

1. A wireless combination device, comprising:
   a first wireless transceiver configured for communication via a first wireless network over a first band;
   a second wireless transceiver configured for communication via a second wireless network over a second band that overlaps said second band, and
   a medium allocation scheduler coupled to said first wireless transceiver and said second wireless transceiver for implementing spaced-mode operation comprising inserting idle gaps in transmissions via said second wireless network when triggered by a presence of at least one spaced-mode triggering condition, wherein said idle gaps allow wireless transmissions via said first wireless network to be received by said combination device.

2. The wireless combination device of claim 1, wherein said spaced-mode triggering condition comprises no activity detected on said first wireless network over a predetermined time window.

3. The wireless combination device of claim 1, wherein said medium allocation scheduler is operable when said spaced-mode triggering condition is not present for implementing batch-mode operation for transmissions via said second wireless network.

4. The wireless combination device of claim 1, wherein said spaced-mode triggering condition comprises at least one of:
   i) when no frames from said first wireless network have been received by said combination device in a first past time window;
   ii) when a number frames from said first wireless network received by said combination device in a second past time window is below some predetermined threshold;
   iii) when a pattern in a frame received from said first wireless network includes a signature indicating an end of a flow, and
   iv) when there is no station (STA) in said first wireless network associated with an access point (AP) running at said combination device.

5. The wireless combination device of claim 1, wherein said spaced-mode triggering condition comprises a clear to send (C2S) signal not being used by said combination device to defer transmission from other nodes in said first wireless network.

6. The wireless combination device of claim 1, wherein said spaced-mode triggering condition comprises when a number of delay-sensitive pending packets for transmission over said second wireless network is below some predetermined threshold.

7. The wireless combination device of claim 1, wherein said first wireless network comprises a wireless local area network (WLAN) and said second wireless network comprises a wireless personal area network (WPAN).

8. The wireless combination device of claim 7, wherein said WPAN comprises Bluetooth (BT).

9. The wireless combination device of claim 8, wherein a BT Master device in said WPAN transmits at even BT slots with each said even BT slot being x msecs in duration, and wherein durations of said idle gaps are integer multiples of 2×msecs.

10. The wireless combination device of claim 9, wherein said x=0.625 msec.

11. A method of wireless communications, comprising:
   providing a wireless combination device including a first wireless transceiver configured for communication via a first wireless network over a first band, a second wireless transceiver configured for communication via a second wireless network over a second band, wherein said first band overlaps said second band on a medium used for said wireless communications;
   granting said second wireless network said medium to send pending packets; determining whether at least one spaced-mode triggering condition is present, wherein when said spaced-mode triggering condition is present, operating said wireless combination device in a spaced-mode while transmitting said pending packets to a second wireless device that is configured for communication via said second wireless network by inserting idle gaps between said pending packets, and
   wherein when said spaced-mode triggering condition is not present, operating said wireless combination device in a batch-mode while transmitting said pending packets to said second wireless device.

12. The method of claim 11, wherein said combination device serves as an access point (AP) for said first wireless network.

13. The method of claim 11, wherein said wireless combination device dynamically switches between said spaced-mode and said batch-mode during operation.

14. The method of claim 11, wherein said spaced-mode triggering condition comprises no activity detected on said first wireless network over a predetermined time window.

15. The method of claim 11, wherein said spaced-mode triggering condition comprises at least one of:
   i) when no frames from said first wireless network have been received by said combination device in a first past time window;
   ii) when a number frames from said first wireless network received by said combination device in a second past time window is below some predetermined threshold;
   iii) when a pattern in a frame received from said first wireless network includes a signature indicating an end of a flow, and
   iv) when there is no station (STA) in said first wireless network associated with an access point (AP) running at said combination device.

16. The method of claim 11, wherein said spaced-mode triggering condition comprises a clear to send (C2S) signal not being used by said combination device to defer transmission from other nodes in said first wireless network.

17. The method of claim 11, wherein said spaced-mode triggering condition comprises when a number of delay-sensitive pending packets for transmission over said second wireless network is below some predetermined threshold.

18. The method of claim 11, wherein said first wireless network comprises a wireless local area network (WLAN) and said second wireless network comprises a wireless personal area network (WPAN).

19. The method of claim 17, wherein said WPAN comprises Bluetooth (BT).

20. The method of claim 19, wherein a BT Master device in said WPAN transmits at even BT slots with each said even BT slot being x msecs in duration, and wherein durations of said idle gaps are integer multiples of 2×msecs.

21. The method of claim 20, wherein said x=0.625 msec.

* * * * *